Oct. 30, 1934.　　　B. E. G. FORSLING　　　1,978,837
GAS TURBINE POWER PLANT
Filed July 6, 1933　　　2 Sheets-Sheet 1

Inventor:
Bengt E.G.Forsling,
by　Harry E. Dunham
His Attorney.

Oct. 30, 1934.  B. E. G. FORSLING  1,978,837
GAS TURBINE POWER PLANT
Filed July 6, 1933  2 Sheets-Sheet 2

Inventor:
Bengt E.G. Forsling,
by Harry E. Dunham
His Attorney.

Patented Oct. 30, 1934

1,978,837

UNITED STATES PATENT OFFICE 1,978,837

GAS TURBINE POWER PLANT

Bengt E. G. Forsling, Rugby, England, assignor to General Electric Company, a corporation of New York Application July 6, 1933, Serial No. 679,200 In Great Britain January 18, 1933

8 Claims. (Cl. 290—4)

The present invention relates to gas turbine power plants in which a plurality of gas turbine sets receive gases from a gas generator or furnace. The invention relates to both power plants operating above and below atmospheric pressure, as well as to power plants operating partly below and partly above atmospheric pressure.

A power plant of this kind may comprise a gas generator and two gas turbines connected thereto and receiving gases from the generator. The flow of gases through the generator and the turbines in a plant operating above atmospheric pressure is usually maintained by a compressor or blower driven by one of the turbines and forcing air into the gas generator.

In a plant operating below atmospheric pressure the flow of air through the gas generator and the turbines is usually maintained by an exhauster connected to the exhaust of at least one of the turbines. In both cases the means for maintaining the flow of air, that is, the compressor or the exhauster, is driven by one of the turbines, whereas the other turbine usually drives an electric generator for supplying electric energy to a line. Difficulties have been experienced in obtaining the proper balance between the demand for load from the turbo-generator set and the load required by the other set, that is, the second turbine driving a blower or an exhauster.

One object of my invention is to provide an improved construction and arrangement for gas turbine power plants whereby the load of a plurality of sets comprising gas turbines receiving gas from the furnace may be balanced more effectively and regulated as desired.

Another object of my invention is to provide an improved arrangement for starting a gas turbine power plant.

For a consideration of what I believe to be novel and my invention, attention is directed to the following description and the claims appended thereto in connection with the accompanying drawings.

Figure 1:
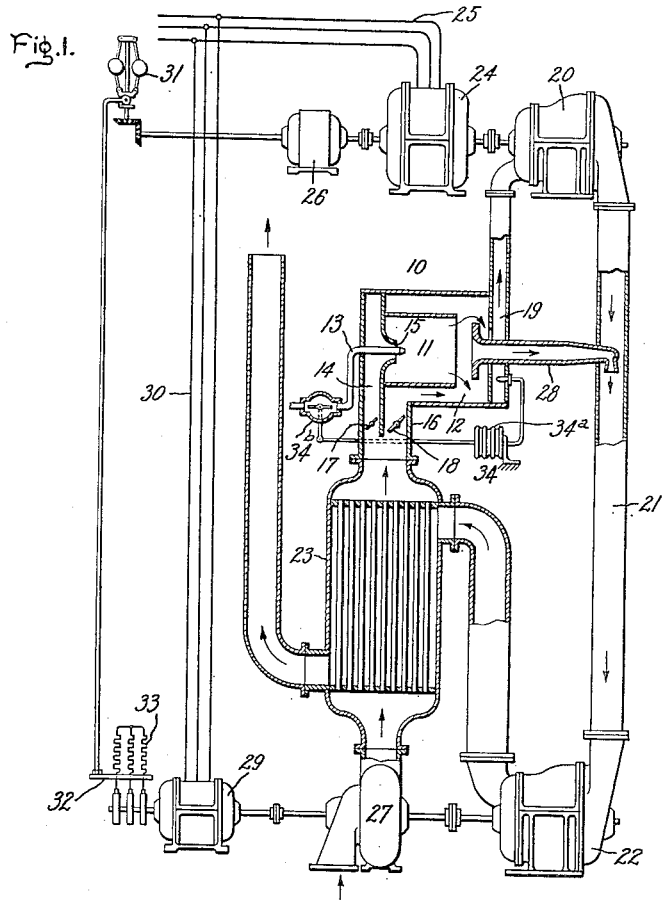
Figure 4:
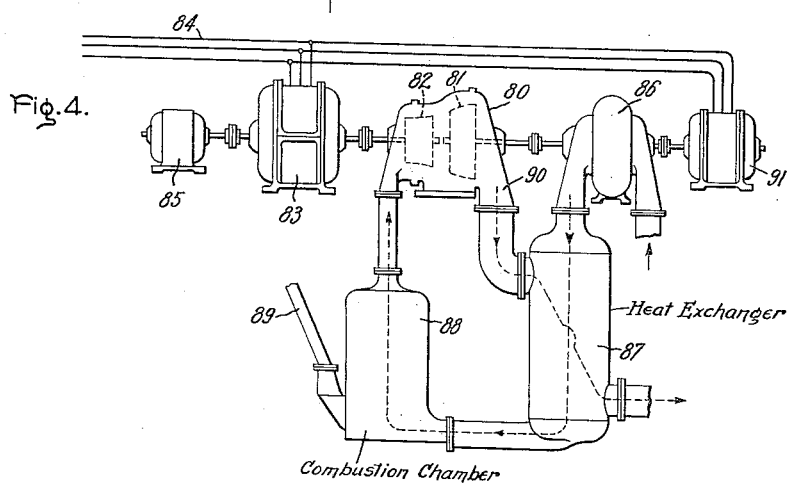
Figure 3:
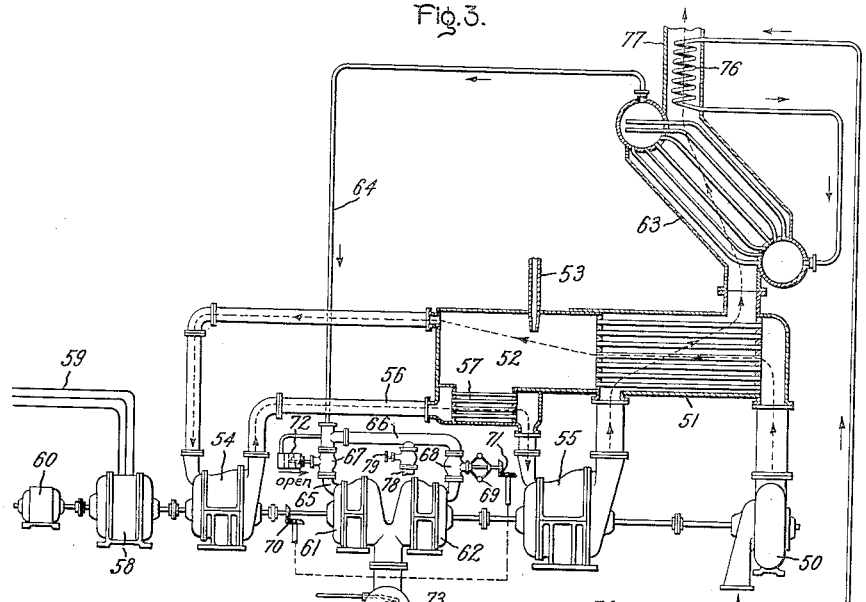
Figure 2:
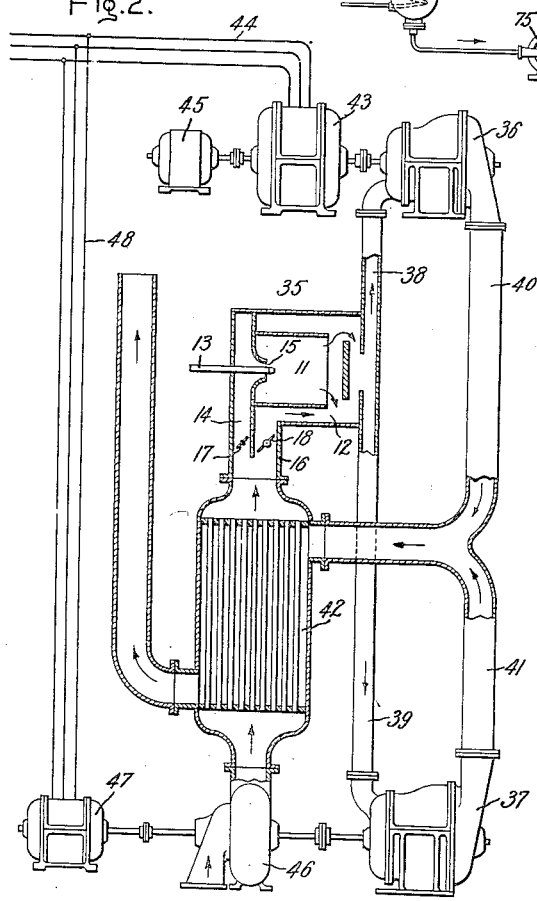

In the drawings, Fig. 1 represents a diagrammatic illustration of a gas turbine power plant embodying my invention and Figs. 2, 3 and 4 show modifications of power plants according to my invention.

The gas power plant shown in Fig. 1 comprises a gas generator or furnace 10 having a combustion chamber 11 and a mixing chamber 12. Combustible material is supplied to the combustion chamber 11 by a burner 13 and air for maintaining combustion is conducted into the chamber by a conduit 14 forming an annular opening 15 around the burner 13. The combustion chamber opens near its right-hand end into the mixing chamber so that a part of the combustion gases flow into the mixing chamber 12 where they are mixed with air supplied to the mixing chamber through a conduit 16. The flow of air to the combustion chamber and to the mixing chamber is regulated by valves 17 and 18 respectively. The air mixture obtained at the right-hand end of the mixing chamber is conducted through a channel 19 to the inlet of a high pressure turbine 20. The exhaust of the latter is connected by a cross-over conduit 21 with the inlet of a low pressure turbine 22 whereby exhaust gases are conducted from the exhaust of the high pressure turbine into the low pressure turbine in which their available energy is transformed into mechanical energy. The low pressure turbine exhausts into a heat exchanger 23 in which the heat contained in the exhaust gases of the low pressure turbine is partly transferred to the air supplied to the gas generator. In the arrangement shown in the present instance the high pressure turbine drives an A. C. generator 24 connected to an electric line 25 and an exciter 26 for the generator. The low pressure turbine drives a blower or compressor 27 for forcing air into the gas generator. The blower 27 represents broadly a means for maintaining the flow of gases from the generator through the turbines. To reheat the gases conducted from the exhaust of the high pressure turbine 20 to the low pressure turbine 22, I provide a conduit 28 for conducting gases directly from the combustion chamber into the cross-over conduit 21. This arrangement is more fully disclosed in the copending application of F. Samuelson, Serial No. 675,778, filed June 14, 1933.

In an arrangement of this kind the output of the second power set comprising the low pressure turbine 22 and the blower 27 depends upon the load demand from the first turbine set comprising the high pressure turbine 20 and the generator 24. This dependence is only partly eliminated by the provision of reheating means including the conduit 28. Regarding the reheating means for supplying combustion gases into the cross-over conduit, I have found that the greatest efficiency is obtained if the adiabatic heat drop is about the same for both turbines. The compressor will, however, generally absorb more than half the total available energy unless considerably higher turbine inlet temperatures are adopted than are practical with normal materials, having in view a reasonable length of life of the parts exposed to the high temperature.

According to my invention I provide means for balancing the load output or input between the two power sets. This means comprises in the present instance a dynamo-electric machine 29 of the three-phase induction type coupled with the blower 27 and connected by a line 30 to the electric line 25. The load balancing means is associated with one of the power sets and is provided outside the gas cycle, that is, its actuation has no direct effect on the flow of gases as a valve provided in the path of the gases would have. Under ordinary conditions the dynamo-electric machine operates as a motor, that is, takes power from line 25 or from the first power set and transmits it to the blower 27. The dynamo-electric machine 29, however, may also operate as a generator which may be the case if the load demand from the first power set decreases suddenly. In this case the mechanical load output of the turbine 22 is partly transmitted to the machine 29 and converted therein into electrical energy supplied to line 25. Thus, with this arrangement it is possible to balance the load demand between the two power sets, that is, to transmit load from one set to the other. The provision of this balancing means in addition has the advantage of making it possible to perform the reheating in the cross-over conduit 21 at the most suitable point from a thermo-dynamic point of view and to distribute the adiabatic heat drop accordingly. The means for balancing the load between the two sets forms at the same time a simple arrangement for starting the power plant.

In a preferred embodiment of my invention I provide means for regulating the supply of electric energy to motor 29 in response to speed changes of the electric generator 24. In the arrangement shown in Fig. 1 this is accomplished by the provision of a speed governor 31 driven from the first power set and connected to a contactor 32 sliding on a resistance 33 inserted in the secondary circuit of the motor 29. During operation an increase in speed of the generator 24, owing to a decrease in demand for load output, causes the weights of the speed governor 31 to move outward, effecting upward movement of the contactor 32, and an increase of the resistance in the secondary circuit. The supply of electric energy to motor 29 is thereby decreased, resulting in a decreased load output of the motor and accordingly a lower speed of the blower 27. The lower speed of blower 27 results in a decreased supply of air to the gas generator.

It is desirable to maintain a substantially constant temperature of the gases supplied to the gas turbine. This is accomplished in accordance with my invention by a temperature responsive device 34 comprising a bellows 34a and a conduit having a sealed end subject to the temperature of the air-gas mixture. The bellows and the conduit are sealed and contain a gas. If the temperature of the gas-air mixture increases, for instance, due to a decreased supply of air to the gas generator, the gas pressure in the bellows increases, causing expansion of the bellows. The latter is connected through a link mechanism to a suitable valve 34b for regulating the flow of combustible material to the burner 13. During operation, expansion of the bellows, due to an increased temperature of the gas-air mixture, effects closing movement of the valve 34b, resulting in a decreased supply of combustible material to the gas generator and consequently a decreased temperature of the gas-air mixture produced in the furnace.

With respect to the arrangement shown in Fig. 1, the starting is accomplished by driving the blower from the dynamo-electric machine 29 which in this case operates as a motor, the electric energy being supplied to the motor by the line 25. With the compressor driven from motor 29, air is supplied at reduced pressure to the gas generator at a rate sufficient to permit starting the combustion chamber and accordingly the high pressure turbine.

Whereas in the arrangement shown in Fig. 1 the two turbines are connected in series, the invention is equally applicable to an arrangement in which the turbines for driving the compressor and for supplying external work are connected in parallel, that is, in which both operate on gases of the same initial pressure. Such an arrangement is illustrated in Fig. 2. It comprises a gas generator 35, two turbines 36 and 37 having inlet conduits 38 and 39 respectively connected to the gas generator 35 and exhaust conduits 40 and 41 respectively connected to a heat exchanger 42 for preheating the air supplied to the gas generator. The turbine 36 drives an electric generator 43 connected to a line 44 and an exciter 45 for the generator. The second turbine 37 drives the compressor 46 which again represents a means for maintaining the flow of gases through the gas generator and the turbines. Coupled with the blower in accordance with my invention is a dynamo-electric machine 47 corresponding to the machine 29 of Fig. 1 and being connected by a line 48 to the electric line 44. The operation is similar to that of the arrangement of Fig. 1. The dynamo-electric machine forms a means for balancing the load output between the two power sets, that is, the turbo-generator set comprising the turbine 36 and the generator 43 and the turbo-compressor set comprising the turbine 37 and the compressor 46. The dynamo-electric machine 47 also serves to start the plant. During starting, the machine 47 operates as a motor fed from the line 44 and driving the compressor 46 to supply air to the gas generator 35.

In the two examples described above, the balancing of the power sets, that is, the transmission of power from one set to the other is accomplished by electric machines coupling the two sets. In the following example illustrated in Fig. 3 the transmission of power from one set to the other, that is, the distribution of power among the individual sets or shafts, is accomplished by steam turbines which receive steam from a steam generator heated by the exhaust gases of the gas turbines. The arrangement will best be understood by following the flow of gases through the apparatus, the flow being indicated by a dotted line and the direction of flow by arrows on this line. The flow of gases is maintained by a compressor 50 which has its discharge conduit connected to a heat exchanger or air preheater 51. The latter is connected to a gas generator 52 having a burner 53 for supplying combustible material to the combustion chamber. Connected in series to the gas generator are two gas turbines 54 and 55. The cross-over conduit 56 between the high pressure turbine 54 and the low pressure turbine 55 includes a reheater 57 for reheating the gases discharged from the high pressure turbine 54. The reheater 57 is united with the gas generator and uses hot gases from the generator for reheating the gases flowing through the cross-over conduit 56. The exhaust gases of the low pressure turbine 55 flow through the air preheater or heat exchanger 51 in which the available heat energy of the exhaust gases is transmitted to the air flowing into the gas generator.

In the present arrangement the low pressure turbine 55 serves to drive the compressor 50, that is, the means for maintaining the flow of air through the gas generator and the gas turbines, and the high pressure turbine 54 serves to perform external work. In the present example the turbine 54 is coupled with an electric generator 58 connected to an electric line 59 and an exciter 60 for the generator 58.

In accordance with my invention I provide two steam turbines 61 and 62 coupled with the generator 58 and the compressor 50 respectively. The steam for operating the turbines is produced in a steam generator 63 which is heated by the exhaust gases leaving the air preheater 51. Steam is conducted from the steam generator 63 through a conduit 64 connected to the turbines by branch conduits 65 and 66 respectively. Each of the branch conduits includes a valve 67 and 68 respectively for controlling the flow of steam to the turbines 61 and 62 respectively. In the present example the flow of steam to the turbine 62 is controlled by a speed governor 69 connected to the valve 68 and driven from the shaft of the generator 58 by means including gears 70 and 71. The valve 67 for controlling the flow of steam to turbine 61 is operated in response to pressure conditions in the steam generator. To this end I provide a pressure cylinder 72 including a piston connected to the valve. One side of the piston is subject to the steam pressure in the generator and the other side is biased towards closing direction of the valve by a spring. The arrangement is such that the valve 67 is opened as the pressure in the steam generator exceeds a predetermined value. Both steam turbines 61 and 62 exhaust into a common condenser 73. The condensate is returned from the condenser to the steam generator 63 through a conduit 74 including a pump 75 and a preheater 76. The preheater is provided within a flue 77 through which the gases leaving the generator 63 pass. Regarding the flow of the exhaust gases it will be readily seen from the drawings that the air preheater 51 and the gas generator 63 and the preheater 76 are connected in series, resulting in a high efficiency of the thermo-dynamic cycle of the arrangement.

The operation of the gas cycle, that is, the gas generator and the two gas turbines is similar to that of the arrangements described above. Steam produced in the gas generator 63 is primarily conducted to the turbine 62 in which its available energy is converted into mechanical energy for driving the compressor 50. Only when the steam pressure in the steam generator exceeds a predetermined value is steam supplied to the second steam turbine 61 in which its available energy is converted into mechanical energy and finally through the electric generator 58 into electric energy which is supplied to the line 59. With this arrangement the turbine 61 receives only the quantity of steam available in excess of the requirement of the compressor 50. The plant is started by supplying steam to the turbine 62 for driving the compressor. To this end the branch conduit 66 is connected to another conduit 78 including a valve 79 for receiving steam from any suitable source, not shown. The turbine 62 is dimensioned to drive the compressor 50 during the starting period to deliver air at reduced pressure to the gas generator at a rate sufficient to maintain combustion therein and start the high pressure turbine.

A mechanical simplification of the arrangements illustrated in Figs. 1 and 2 is obtained by combining the two turbines, that is, by providing a common casing for both of them. Such an arrangement is illustrated in Fig. 4 in which I have shown a double turbine 80 comprising two rotors 81 and 82 indicated by dotted lines. The rotor 82 receives high pressure gases and drives a generator 83 connected to an electric line 84 and an exciter 85 for the generator. The other rotor 81 receives gases from the last stage of the high pressure rotor and drives a blower or compressor 86. Air discharged from the compressor 86 is preheated in a heat exchanger 87 whence it is conducted into a gas generator 88 having a burner 89 for supplying combustible material to the combustion chamber thereof. Gases or a gas-air mixture is conducted from the gas generator and flows through the two turbines 82 and 81. The exhaust 90 of the double turbine is connected to the heat exchanger 87 in which the available heat energy of the exhaust gases is transferred to the air flowing through the heat exchanger.

A dynamo-electric machine 91 is coupled with the blower and connected to the electric line 84 for transmitting power between the two sets. During normal operation the machine 91 operates as a motor taking electric energy from the line 84, that is, from the first power set comprising the turbine part 82 and the electric generator 83, and transforms this electric energy into mechanical energy for driving the blower 86. Under certain conditions, that is, when the mechanical load output of the second turbine part 81 exceeds the requirement of the compressor, the excessive output is transformed by the machine 91 into electric energy and transferred to the line 84.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States, is,—

1. In a gas turbine power plant, the combination of a gas generator, an electric line, a power set comprising a turbine receiving gases from the generator and an electric generator driven by the turbine and connected to the line, a second power set comprising a second turbine receiving gases from the generator and exhaust gases from the first named turbine, and means driven by the second turbine for maintaining the flow of gases from the gas generator through the turbines, and means for balancing the load output between the two turbines.

2. In a gas turbine power plant, the combination of a gas generator, an electric line, a power set comprising a turbine receiving gases from the generator and an electric generator driven by the turbine and connected to the line, a second power set comprising a second turbine receiving gases from the generator and means driven by the second turbine for maintaining the flow of gases from the gas generator through the turbines, and means for balancing the load output between the two turbines comprising a dynamo-electric machine coupled with a second power set and connected to the electric line.

3. In a gas turbine power plant, the combination of a gas generator, an electric line, a power set comprising a turbine receiving gases from the generator and an electric generator driven by the turbine and connected to the line, a second power set comprising a second turbine receiving gases from the generator and means driven by the second turbine for maintaining the flow of gases from the gas generator through the turbines, and means provided outside the gas cycle and associated with one of the sets for altering the power distribution between the two turbines.

4. In a gas turbine power plant, the combination of a gas generator, an electric line, a power set comprising a turbine receiving gases from the generator and an electric generator driven by the turbine and connected to the line, a second power set comprising a second turbine receiving gases from the generator and means driven by the second turbine for maintaining the flow of gases from the gas generator through the turbines, and means for starting the plant comprising a dynamo-electric machine coupled with the second power set.

5. In a gas turbine power plant, the combination of a gas generator, an electric line, a power set comprising a turbine receiving gases from the generator and an electric generator driven by the turbine and connected to the line, a second power set comprising a second turbine receiving gases from the generator and means driven by the second turbine for maintaining the flow of gases through the gas generator and the turbines, means for transmitting power between the two sets comprising a steam generator receiving exhaust gases from the above mentioned turbines for producing steam, a steam turbine for each set connected to the steam generator, and means regulating the flow of steam to each of the steam turbines.

6. In a gas turbine power plant, the combination of a gas generator, an electric line, a turbo-generator set comprising a turbine connected to the gas generator and an electric generator connected to the line, a turbo-compressor set comprising a second turbine connected to the gas generator and a compressor for supplying air to the gas generator, means for balancing the load demand on the two turbines comprising a steam generator, a steam turbine connected to the steam generator and coupled with the turbo-compressor set, means for controlling the flow of steam to said turbine in response to speed changes of the turbo-generator set, a second steam turbine connected to the steam generator and coupled with the turbo-generator set, and means for controlling the flow of steam to the second steam turbine in response to pressure conditions in the steam generator.

7. In a gas turbine power plant, the combination of a gas generator, an electric line, a power set comprising a turbine receiving gas from the generator and an electric generator driven by the turbine and connected to the line, a second power set comprising a second turbine receiving gases from the generator and means driven by the second turbine for maintaining the flow of gases from the gas generator through the turbines, a dynamo-electric machine coupled with the second power set and electrically connected to the line, and means for controlling the load input of the dynamo-electric machine in response to speed changes of the electric generator.

8. In a gas turbine power plant, the combination of a gas generator having an outlet for discharging a gas-air mixture, means for supplying combustible material to the generator, means including a temperature responsive device for controlling the supply of combustible material in response to temperature conditions in the outlet, an electric line, a power set comprising a turbine receiving gases from the generator and an electric generator driven by the turbine and connected to the line, a second power set comprising a second turbine receiving gases from the generator and means driven by the second turbine for maintaining the flow of gases from the gas generator through the turbines, and means for balancing the load output between the two sets.

BENGT E. G. FORSLING.